(12) United States Patent
Arnold et al.

(10) Patent No.: US 11,273,646 B2
(45) Date of Patent: Mar. 15, 2022

(54) FLUID DELIVERY

(71) Applicant: HEWLETT-PACKARD DEVELOPMENT COMPANY, L.P., Spring, TX (US)

(72) Inventors: Christopher J. Arnold, Vancouver, WA (US); Russell S Sauer, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/607,582

(22) PCT Filed: Jun. 21, 2018

(86) PCT No.: PCT/US2018/038859
§ 371 (c)(1),
(2) Date: Oct. 23, 2019

(87) PCT Pub. No.: WO2019/177646
PCT Pub. Date: Sep. 19, 2019

(65) Prior Publication Data
US 2021/0276339 A1 Sep. 9, 2021

(30) Foreign Application Priority Data
Mar. 12, 2018 (WO) ................ PCT/US2018/022048

(51) Int. Cl.
B41J 2/17 (2006.01)
B41J 2/175 (2006.01)
B41J 2/18 (2006.01)
B41J 2/19 (2006.01)

(52) U.S. Cl.
CPC ............. *B41J 2/1714* (2013.01); *B41J 2/175* (2013.01); *B41J 2/17523* (2013.01); *B41J 2/18* (2013.01); *B41J 2/19* (2013.01)

(58) Field of Classification Search
CPC .................................................... B41J 2/17523
USPC .......................................................... 347/86
See application file for complete search history.

(56) References Cited

U.S. PATENT DOCUMENTS 5,276,468 A * 1/1994 Deur .................... B41J 2/17593
347/17
5,788,388 A 8/1998 Cowger et al.
6,152,559 A 11/2000 Kojima
6,275,664 B1 8/2001 Wolf et al.
(Continued)

FOREIGN PATENT DOCUMENTS

CN 103386818 A 11/2013
CN 104369539 A 2/2015
(Continued)

Primary Examiner — Kristal Feggins
Assistant Examiner — Alexander D Shenderov
(74) Attorney, Agent, or Firm — Dierker & Kavanaugh PC

(57) ABSTRACT

A fluid delivery system may include a fluid reservoir that may include a fluid supply port through which fluid is supplied to the fluid reservoir, a fluid outlet port through which a first portion of discharged fluid is supplied from the reservoir to a fluid ejection device, a fluid inlet port through which a second portion of the discharged fluid is recirculated back to the reservoir and through which air is pushed into the reservoir and an atmospheric vent to vent the air, that was pushed into the reservoir through the fluid inlet port, from the reservoir.

12 Claims, 5 Drawing Sheets

(56) References Cited

U.S. PATENT DOCUMENTS

| | | | |
|---|---|---|---|
| 6,565,197 B1 | 5/2003 | Murray et al. | |
| 6,752,493 B2 | 6/2004 | Dowell et al. | |
| 6,942,324 B2 | 9/2005 | Campion et al. | |
| 6,955,423 B2 | 10/2005 | Rodriguez | |
| 7,210,771 B2 | 5/2007 | Neese et al. | |
| 7,770,883 B2 | 8/2010 | Jensen | |
| 8,220,910 B2 | 7/2012 | Wanibe | |
| 9,358,803 B2 | 6/2016 | Moriguchi | |
| 10,124,597 B2 | 11/2018 | Alessi et al. | |
| 2001/0020971 A1 | 9/2001 | Usui et al. | |
| 2002/0047882 A1* | 4/2002 | Karlinski | B41J 11/42 347/85 |
| 2005/0168540 A1 | 8/2005 | Wilson et al. | |
| 2007/0081019 A1 | 4/2007 | Karppinen | |
| 2009/0027449 A1 | 1/2009 | Silva et al. | |
| 2010/0208016 A1* | 8/2010 | Menchik | B29C 64/40 347/86 |
| 2012/0169813 A1 | 7/2012 | Gray et al. | |
| 2012/0293592 A1* | 11/2012 | Hibbard | B41J 2/19 347/92 |
| 2014/0146110 A1 | 5/2014 | Melde | |
| 2014/0300666 A1 | 10/2014 | Johnson et al. | |
| 2016/0193785 A1 | 7/2016 | Bell et al. | |
| 2017/0021618 A1 | 1/2017 | Lecheheb et al. | |
| 2017/0259580 A1 | 9/2017 | Olsen | |
| 2017/0320331 A1 | 11/2017 | Alessi et al. | |

FOREIGN PATENT DOCUMENTS

| | | | |
|---|---|---|---|
| CN | 107073946 A | 8/2017 | |
| CN | 107415469 A | 12/2017 | |
| WO | WO2017034951 A1 | 3/2017 | |
| WO | WO-2017064665 A1 | 4/2017 | |

* cited by examiner

FLUID DELIVERY

BACKGROUND

Fluid ejection systems, such as printing systems, utilize a fluid ejection device to eject fluid, in the form of a liquid, to a target. With two-dimensional printing, the target is a two-dimensional sheet or web of media. With three-dimensional printing, the target may be a layer or multiple layers of a build material from which a three-dimensional object may be formed. Many fluid ejection systems may include a fluid delivery system that supplies fluid from a reservoir to the fluid ejection device.

Figure 1:
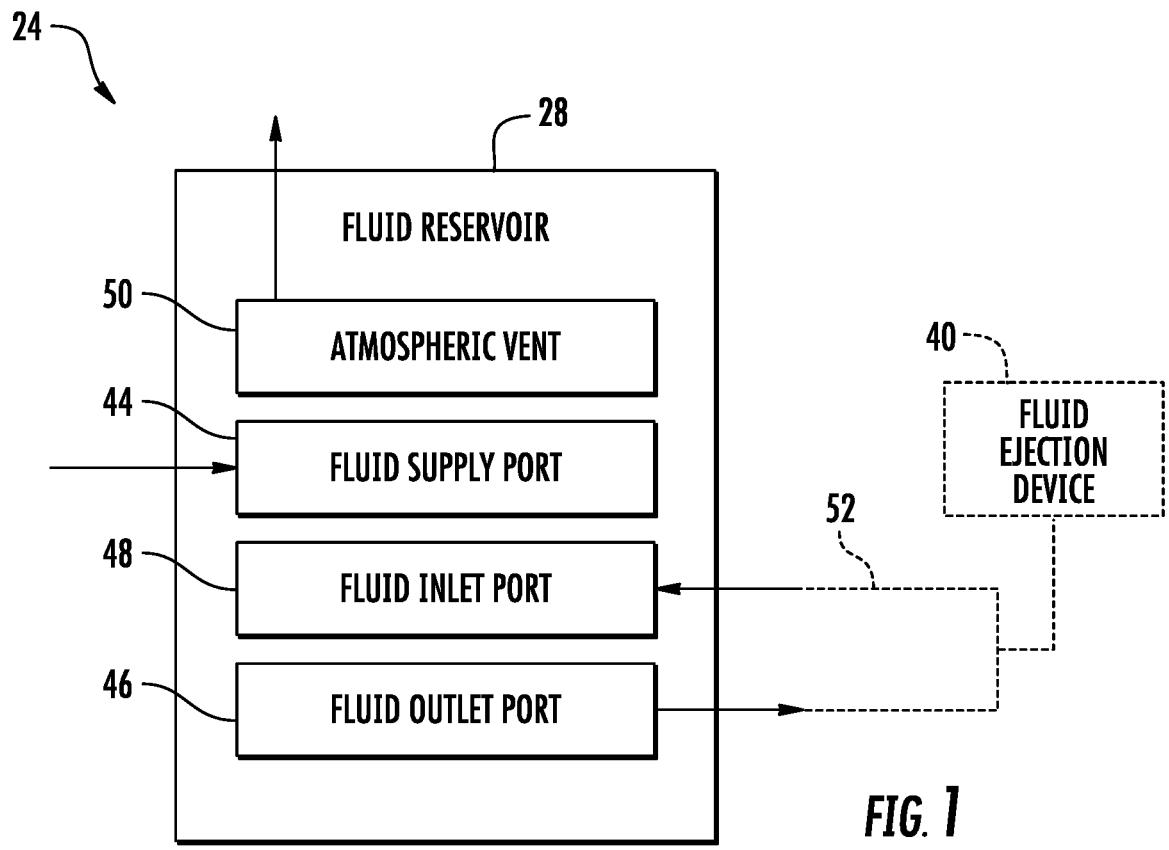
FIG. 1 is a schematic diagram illustrating portions of an example fluid delivery system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example fluid delivery systems, fluid delivery methods and fluid delivery and ejection systems that supply fluid in the form of a liquid to a fluid ejection device. The disclosed example fluid delivery systems, fluid delivery methods and fluid delivery and ejection systems control or manage air within the delivery system that may otherwise impair performance or the delivery of fluid to the fluid ejection device. The example fluid delivery systems, fluid delivery methods and fluid delivery and ejection systems further provide a modular system that facilitates versatility and adaptability to different fluid supply stations and fluid supplies.

In some implementations, the example fluid delivery systems, fluid delivery methods and fluid delivery and ejection systems circulate fluid from a fluid reservoir, wherein a first part of the circulated fluid is delivered to a fluid ejection device and wherein a second part of the circulated fluid returns to the reservoir. The returning fluid may, at times, carry or push air within the fluid line into the reservoir. The reservoir comprises an atmospheric vent that vents excess received air to atmosphere.

In some implementations, the reservoir is supplied with fluid from a fluid supply station module which is releasably or removably connected to the reservoir. In some implementations, the fluid supply station module may itself be releasably or removably connected to a fluid supply. In some implementations, the reservoir is formed as a module that is releasably connected to the fluid ejection device.

In some implementations, the reservoir comprises a sump in the floor of the reservoir adjacent or proximate to a fluid outlet through which fluid is pumped or drawn when being circulated to the fluid ejection device. The level of fluid within the reservoir is sensed by sensor that is positioned such that the fluid outlet is submerged while the at least one sensor is no longer in contact with the liquid. In one implementation, the at least one sensor extends to the some or downward into the sump. This arrangement may reduce the amount of fluid that may be stranded within the reservoir when the reservoir is substantially empty and may reduce introduction of air into the fluid line through a fluid outlet port through which fluid is circulated to the fluid ejection device.

Disclosed herein is an example fluid delivery system that may include a fluid reservoir which may include a fluid supply port through which fluid is supplied to the fluid reservoir, a fluid outlet port through which a first portion of discharged fluid is supplied from the reservoir to a fluid ejection device, a fluid inlet port through which a second portion of the discharged fluid is recirculated back to the reservoir and through which air is pushed into the reservoir, and an atmospheric vent to vent the air, that was pushed into the reservoir through the fluid inlet port, from the reservoir.

Disclosed herein is an example fluid delivery method. The method may include drawing fluid from a reservoir and pumping the fluid to a fluid ejection device, returning a portion of the drawn fluid and air to the reservoir and venting the air from the reservoir to atmosphere.

Disclosed herein is an example fluid delivery and ejection system that may comprise a fluid ejection device to selectively eject droplets of fluid, a fluid reservoir module and the fluid reservoir module. The fluid reservoir module may comprise a fluid reservoir comprising a fluid outlet port through which a first portion of discharged fluid is supplied from the reservoir to a fluid ejection device, a fluid inlet port through which a second portion of the discharged fluid is recirculated back to the reservoir and through which air is pushed into the reservoir, an atmospheric vent to vent the air, that was pushed into the reservoir through the fluid inlet port, from the reservoir, a first fluid interface connector, a reservoir pump connected to the fluid outlet to pump fluid to the fluid ejection device, a second fluid interface connector connected to the pump and a third fluid interface connector connected to the fluid inlet port. The system may further comprise a fluid supply station connector module which may include a fourth fluid interface connector releasably connected to the first fluid interface connector, a fluid supply station pump connected to the fourth fluid interface connector and a fifth fluid interface connector. The system may further include a fluid supply station module that may include a fluid supply station to supply fluid from a fluid supply and a sixth fluid interface connector connected to the fluid supply station and releasably connected the fifth fluid interface connector.

FIG. 1 schematically illustrates portions of an example fluid delivery system 24 which comprises fluid reservoir 28. Fluid delivery system 24 may supply fluid, in the form of a liquid, from fluid reservoir 28 to a fluid ejection device 40 (shown in broken lines). Fluid reservoir 28 comprises an internal volume to contain a fluid, in the form of a liquid. In one implementation, fluid reservoir 28 is to supply fluid to print a three-dimensional object having a maximum mass, wherein reservoir 28 has an internal volume having a fluid holding capacity no less than the amount of the fluid to print three-dimensional object having the maximum mass. As a result, fluid reservoir 28 is sufficiently sized to supply all of the fluid that would be consumed when printing or forming a largest three-dimensional object producible by fluid ejection system, eliminating or reducing the task of filling or exchanging reservoir 28 in the middle of a three-dimensional printing task.

As schematically shown, fluid reservoir 28 additionally comprises fluid supply port 44, fluid outlet port 46, fluid inlet port 48 and atmospheric vent 50. Fluid supply port 44 comprises a port through which fluid may be supplied to the interior of fluid reservoir 28. For example, fluid supply port 44 may be connected to a fluid supply station and/or a fluid supply such that the fluid within reservoir 28 may be replenished. In one implementation, fluid supply port 44 is located at a top of reservoir 28, at an elevation higher than an anticipated height of the fluid within reservoir 28, reducing the likelihood of the fluid from flowing black to the supply.

Fluid outlet port 46 and fluid inlet port 48 cooperate to facilitate fluid recirculation. Fluid outlet port 46 comprises a port through which fluid is pumped or drawn from reservoir 28, wherein a first portion is supplied or delivered to fluid ejection device 40 and wherein a second portion is recirculated or returned to reservoir 28 through fluid inlet port 48. During such recirculation, air may become partially trapped within the recirculation line 52 extending between ports 46 and 48. Recirculation of the fluid may result in air within the line being pushed into reservoir 28 through fluid inlet port 48.

Atmospheric vent 50 comprises an air passage extending from the interior of fluid reservoir 28 to the exterior of fluid reservoir 28, the ambient air or "atmosphere". In one implementation, atmospheric vent 50 may be a direct passage. In other implementations, atmospheric vent 50 be serpentine or in the form of a labyrinth. In one implementation, atmospheric vent 50 comprises a labyrinth screw. In one implementation, vent 50 comprise a passive event. In another implementation, vent 50 comprises valve or an active vent. Because vent 50 vents air within reservoir 28 to atmosphere, separate air gas containing chambers or receivers may be omitted. Pressure within reservoir 28 is maintained, reducing the likelihood of air become entrapped in the fluid delivered to fluid ejection device 40.

Figure 2:
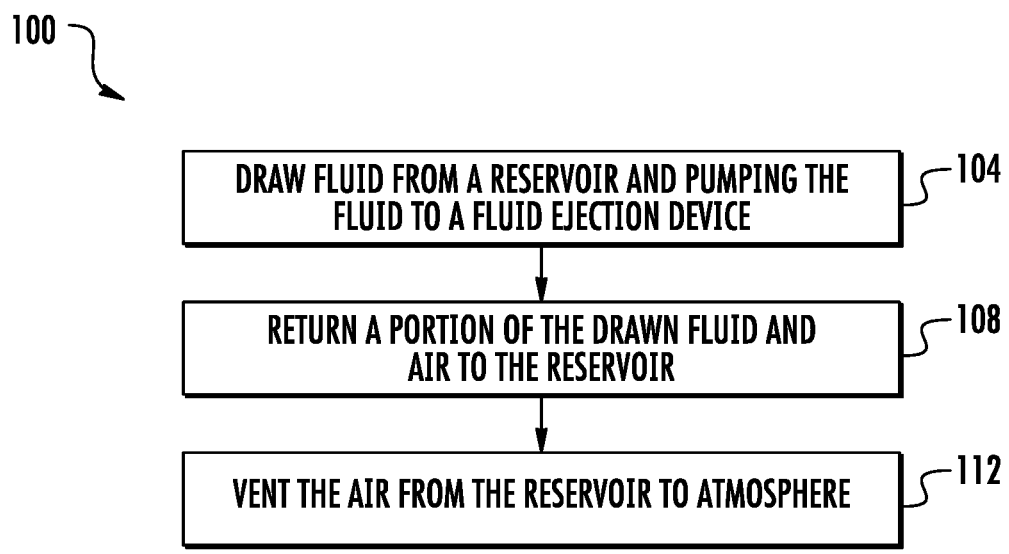
FIG. 2 is a flow diagram of an example fluid delivery method.

FIG. 2 is a flow diagram of an example fluid delivery method 100. Fluid delivery method 100 provides for fluid recirculation and air management. Although method 100 is described in the context of being carried out with fluid delivery system 24 and fluid reservoir 28, it should be appreciated that method 100 may also be carried out with any of the fluid delivery systems or fluid delivery and ejection systems described hereafter. Likewise, method 100 may be carried out with similar fluid delivery systems and reservoirs.

As indicated by block 104, fluid, in the form of a liquid, is drawn from reservoir 28 and pumped to a fluid ejection device. As indicated by block 108, a portion of the drawn fluid, along with air within a fluid delivery line, is returned to the reservoir. As indicated by block 112, the returned air within the reservoir is vented to atmosphere by vent 50. Because vent 50 vents air within reservoir 28 to atmosphere, separate air gas containing chambers or receivers may be omitted. Pressure within reservoir 28 is maintained, reducing the likelihood of air become entrapped in the fluid delivered to fluid ejection device 40.

Figure 3:
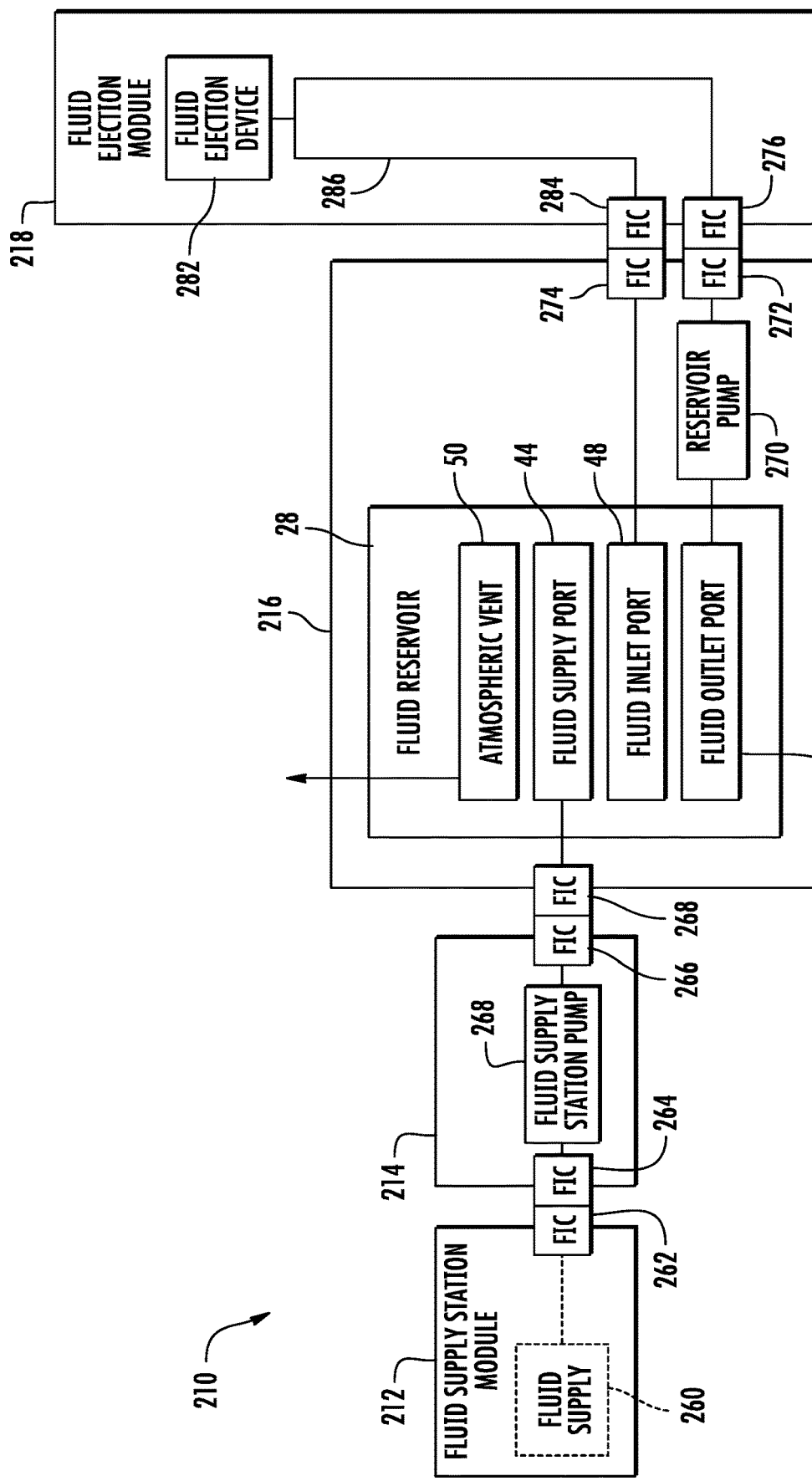
FIG. 3 is a schematic diagram illustrating portions of an example fluid delivery and ejection system.

FIG. 3 schematically illustrates portions of an example fluid delivery and ejection system 210. System 210 comprises fluid supply station module 212, fluid supply station connector module 214, fluid reservoir module 216 and fluid ejection module 218. Fluid supply station module 212 comprises a single unit or enclosed unit that supplies fluid, in the form of a liquid, from a supported fluid supply 260 to fluid reservoir module 216 through fluid supply station connector module 214. In one implementation, the fluid supply 260 is itself removably or releasably connected to fluid supply station module 212 such that an empty or exhausted fluid supply 260 may be replaced with a full fluid supply 260. For purposes of this disclosure, the term "releasably" or "removably" with respect to an attachment or coupling of two structures means that the two structures may be repeatedly connected and disconnected to and from one another without material damage to either of the two structures or their functioning. In other implementations, fluid supply 260 may be a permanent part of fluid supply station module 212. In some implementations, fluid supply station module 212 may be disposable.

Fluid supply station module 212 further comprises a fluid interface connector 262 which is connected to a fluid supply 260. Fluid interface connector 262 is located at an exterior surface or exterior portion of the housing forming module 212. Fluid interface connector 262 releasably mates with a corresponding fluid interface connector of fluid supply station connector module 214.

Fluid supply station connector module 214 comprises a single unit or enclosed unit that interconnects fluid supply station module 212 and fluid reservoir module 216. Fluid supply station connector module 214 further assists in the withdrawing of fluid from fluid supply 260 of fluid supply station module 212. Fluid supply station connector module 214 comprises fluid interface connector 264, fluid interface connector 266 and fluid supply station pump 268.

Fluid interface connector 264 releasably and removably connect to fluid interface connector 262. Fluid interface connector 264 is located at an exterior surface or exterior portion of the housing forming module 214. Fluid interface connectors 264 and 262 cooperate to form a fluid coupler between module 212 and 214. In one implementation, connectors 262, 264 comprise cooperating male and female parts, such as a plug and a port, which when connected, provide a fluid passageway for fluid from fluid supply 260 to pass into module 214. Fluid interface connector 264 facilitates the use of different fluid supply station modules 212 containing different fluid supplies 260 as part of system 210.

Fluid supply station pump 268 comprises a fluid pump that moves or pumps fluid received through fluid interface connector 264 through fluid interface connector 266 into fluid reservoir module 216. Fluid interface connector 266 releasably and removably connects to a corresponding fluid interface connector of fluid reservoir module 216. Fluid interface connector 266 is located at an exterior surface or exterior portion of the housing forming module 214. Fluid interface connectors 264 and 266 facilitate the provision of fluid supply station pump 268 independent of fluid supply station module 212 and independent of fluid reservoir module 216. As a result, fluid supply station module 212 may be less complex and less expensive. Likewise, fluid reservoir module 216 may be less complex and less expensive. In some implementations, fluid supply station module 212 and fluid supply connector module 214 may be provided as a single module or a single unit releasably and are only connected to fluid reservoir module 216 using a pair of cooperating fluid interface connectors.

Fluid reservoir module 216 comprises a single housed or enclosed unit that serves as a reservoir for storing fluid to be supplied to a fluid ejection module and for facilitating the controlled pumping or withdrawal of fluid from the reservoir. Fluid reservoir module 216 comprises fluid reservoir 28 (described above), fluid interface connector 268, reservoir pump 270, fluid interface connector 272 and fluid interface connector 274.

Fluid interface connector 268 releasably connects to fluid interface connector 266 of fluid supply station connector module 214. Fluid interface connector 268 is located at an exterior surface or exterior portion of the housing forming module 216. Fluid interface connector 268 and fluid interface connector 266 form a fluid coupler that connects modules 214 and 216. Fluid interface connector 268 cooperatively mates with fluid interconnect 266 to form a continuous fluid passage such that fluid pumped by fluid supply station pump 268 may flow into fluid supply port 44. In one implementation, fluid interface connectors 266 and 268 comprise male and female parts, such as a plug and a port. In another implementations, fluid interface connectors 266 and 268 may have other cooperating and interlocking structures.

Fluid reservoir pump 270 comprises a fluid pumping mechanism connected fluid outlet port 46. Fluid reservoir pump 270 pumps fluid or withdraws fluid from the interior fluid reservoir 28 and supplies such fluid to fluid ejection module 218 through fluid interface connector 272. Fluid interface connector 272 comprise a fluid connector that is to be releasably connected to a corresponding fluid connector of fluid ejection module 218. Fluid interface connector 272 facilitates the circulation of fluid from fluid reservoir 28 and out of module 216.

Fluid interface connector 274 comprises a fluid connector connected to fluid inlet port 48. Fluid interface connector 272 comprise a fluid connector that is to be releasably connected to a corresponding fluid connector of fluid ejection module 218. Fluid interface connector 274 facilitates the recirculation of fluid, the receiving of fluid returning to reservoir 28.

Fluid ejection module 218 comprises a single housed or enclosed unit that provides for the ejection of fluid received from fluid reservoir module 216. Fluid ejection module 218 comprises fluid interface connector 276, fluid ejection device 282 and fluid interface connector 284. Fluid interface connector 276 is connected to reservoir pump 270 at an exterior surface or exterior portion of the housing forming module 218. Fluid interface connector 276 and fluid interface connector 270 to form a fluid coupler connecting modules 216 and 218. Fluid interface connector 276 cooperatively mates with fluid interface connector 272 to form a continuous uninterrupted fluid passage extending between modules 216 and 218. At the same time, fluid interface connector 276 facilitates separation of modules 216 and 218. In one implementation, connectors 272 and 276 may comprise male and female parts, such as a plug and port. In other implementations, connectors 272 and 276 may connect to one another in other releasable fashions.

Fluid ejection device 282 comprise a device that ejects the fluid under the control of a controller. In one implementation, fluid ejection device 282 ejects fluid using a fluid actuator that displaces fluid in a chamber adjacent the fluid actuator through an orifice. Examples of such a fluid actuator include, but are not limited to, piezo-membrane based actuators, electrostatic membrane actuators, mechanical/impact driven membrane actuators, magnetostrictive drive actuators, electrochemical actuators, external laser actuators (that form a bubble through boiling with a laser beam), other such microdevices, or any combination thereof. In the example illustrated, fluid ejection device 282 receives fluid that has been siphoned off or branched off a recirculation loop extending between fluid interface connector 276 and 284. In other implementations, the fluid recirculation loop extending between connectors 276 and 284 directly passes through fluid ejection device 282 or through the chamber adjacent the orifice(s) of fluid ejection device 282.

Fluid interface connector 284 cooperate with fluid interface connector 274 to form a fluid coupler between modules 216 and 218. Fluid interface connector 284 comprises a connector that releasably connects to or cooperatively mates with fluid interface connector 274, forming a continuous fluid passage between modules 216 and 218 for the return of circulating fluid back to reservoir 28 through fluid inlet port 48. In one implementation, fluid interface connectors 284 and 274 comprise male and female parts, such as a plug and port, that provide the breakable interconnection, that allows modules 216 and 218 to be separated and reconnected.

As discussed above, during use of module 218, air may be contained within the fluid circulation lines 286 forming the recirculation loop. Pumping of fluid from reservoir 28 into line 286 through the connection provided by connectors 272 and 276 may result in air being pushed through connectors 284 and 274 into reservoir 28 through fluid inlet port 48. Atmospheric vent 50 vents such received air, providing controlled air management for system 210. Excess air is not allowed to build up within reservoir 28, reducing the likelihood of air impairing the performance of system 210.

Figure 4:
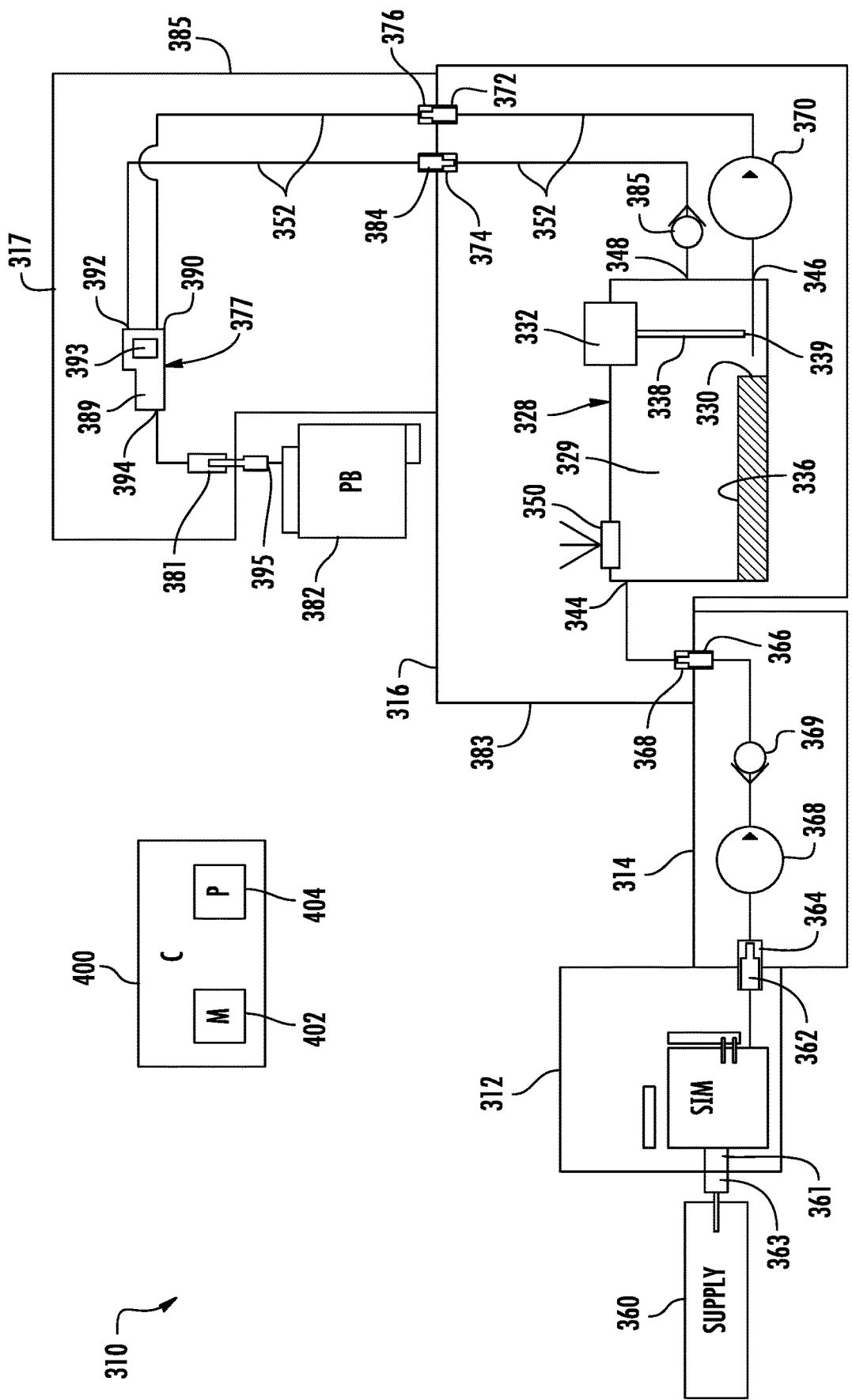
FIG. 4 is a schematic diagram illustrating portions of an example fluid delivery and ejection system with portions shown in section.

FIG. 4 schematically illustrates portions of an example fluid delivery and ejection system 310. System 310 comprises fluid supply station module 312, fluid supply station connector module 314, fluid reservoir module 316, fluid recirculation module 317, fluid ejection device 382 and controller 400. Fluid supply station module 312 comprise a single unit or enclosed unit that supplies fluid, in the form of a liquid, from a connected fluid supply 360 to fluid reservoir module 316 through fluid supply station connector module 314. In the example illustrated, fluid supply station module 312 serves as a dock for removably mounting or releasably connecting to fluid supply 360. In the example illustrated, fluid supply station module 312 comprises a fluid interface connector 361 that releasably and cooperatively mates with a corresponding fluid interface connector 363 associated with the fluid supply 360 such that an empty or exhausted fluid supply 360 may be replaced with a full fluid supply 360. In one implementation, the fluid interface connectors 361, 363 may comprise male and female parts, such as a plug and port that receives the plug. In another implementation, fluid interface connectors 361, 363 may comprise a needle and a septum. In yet other implementations, fluid interface connector 361, 363 may comprise other fluid coupling structures that form a fluid passage between the interior of supply 360 and fluid supply station module 312.

Fluid supply station module 312 further comprises a fluid interface connector 362 which is connected to a fluid supply 260. Fluid interface connector 362 is located at an exterior surface or exterior portion of the housing forming module 312. Fluid interface connector 362 releasably mates with a corresponding fluid interface connector of fluid supply station connector module 314.

Fluid supply station connector module 314 comprises a single unit or enclosed unit that interconnects fluid supply station module 312 and fluid reservoir module 316. Fluid supply station connector module 314 further assists in the withdrawing of fluid from fluid supply 360 of fluid supply station module 312. Fluid supply station connector module 214 comprises fluid interface connector 364, fluid interface connector 366, fluid supply station pump 368 and one-way check valve 369.

Fluid interface connector 364 releasably and removably connects to fluid interface connector 362. Fluid interface connector 364 cooperate with fluid interface connector 362 to form a fluid coupler between modules 312 and 314. Fluid interface connector 364 is located at an exterior surface or exterior portion of the housing forming module 314. In one implementation, connectors 362, 364 comprise cooperating male and female parts, such as a plug and a port, which when connected, provide a fluid passageway for fluid from fluid supply 260 to pass into module 314. Fluid interface connector 364 facilitates the use of different fluid supply station modules 312 containing different fluid supplies 360 as part of system 310.

Fluid supply station pump 368 comprises a fluid pump that moves or pumps fluid received through fluid interface connector 364, through the one-way check valve 369, through fluid interface connector 366 and into fluid reservoir module 316. Fluid interface connector 366 releasably and removably connects to a corresponding fluid interface connector of fluid reservoir module 316. Fluid interface connector 366 is located at an exterior surface or exterior portion of the housing forming module 314. Fluid interface connectors 364 and 366 facilitate the provision of fluid supply station pump 368 independent of fluid supply station module 312 and independent of fluid reservoir module 316. As a result, fluid supply station module 312 may be less complex and less expensive. Likewise, fluid reservoir module 316 may be less complex and less expensive. In some implementations, fluid supply station module 312 and fluids of fluid supply connector module 314 may be provided as a single module or a single unit releasably connected to fluid reservoir module 316 using a pair of cooperating fluid interface connectors.

Fluid reservoir module 316 comprises a single housed or enclosed unit that serves as a reservoir for storing fluid to be supplied to a fluid ejection module 316 and for facilitating the controlled pumping or withdrawal of fluid from a reservoir of module 316. Fluid reservoir module 316 comprises fluid reservoir 328, fluid interface connector 368, reservoir pump 370, fluid interface connector 372, fluid interface connector 374 and one-way check valve 385.

Fluid reservoir 328 comprises an internal volume to contain a fluid, in the form of a liquid. In one implementation, fluid reservoir 328 is to supply fluid to print a three-dimensional object having a maximum mass, wherein reservoir 328 has an internal volume 329 having a fluid holding capacity no less than the amount of the fluid to print three-dimensional object having the maximum mass. As a result, fluid reservoir 328 is sufficiently sized to supply all of the fluid that would be consumed when printing or forming a largest three-dimensional object producible by fluid ejection system, limiting the task of filling or exchanging reservoir 328 in the middle of a three-dimensional printing task.

As further shown by FIG. 4, fluid reservoir 328 additionally comprises sump 330, fluid sensor 332, fluid supply port 344, fluid outlet port 346, fluid inlet port 348 and atmospheric vent 350. Sump 330 comprises a cavity, recess or depression extending from and below a floor 336 of the interior 329 of reservoir 328. Sump 330 extends adjacent or proximate to outlet port 346. Sump 330 contains the last amounts of fluid within reservoir 328 as reservoir 328 is emptied. Sump 330 facilitates more complete exhaustion or use of fluid from reservoir 328. Sump 330 further facilitates a collection or gathering of fluid about and above outlet port 346 to reduce a likelihood of air entering through outlet port 346 or being pumped by pump 370 through outlet port 346. In one implementation, sump 330 has a depth of at least 3.5 mm. In one implementation, sump 330 contains a volume of fluid of at least 2 cubic centimeters.

Fluid sensor 332 comprise a device to sense the presence of fluid. In one implementation, fluid sensor 332 comprises a pair of electrodes that, when submersed, conduct electrical charge. In other implementations, fluid sensor 332 may comprise other sensing devices. As shown by FIG. 4, fluid sensor 332 comprises at least one probe 338 having a lower terminus 339 that is positioned such that the fluid outlet is submerged while the terminus 339 is no longer in contact with the liquid. In another implementation, terminus 339 of fluid sensor 332 projects to a top mouth of the sump 330 or into sump 330 to detect the presence of fluid within sump 330, despite fluid above floor 336 having been exhausted.

Fluid supply port 344 comprises a port through which fluid may be supplied to the interior 329 of fluid reservoir 328. For example, fluid supply port 344 may be connected to a fluid supply station and/or a fluid supply such that the fluid within reservoir 328 may be replenished. In one implementation, fluid supply port 344 is located at a top of reservoir 328, at an elevation higher than an anticipated height of the fluid within reservoir 328, reducing the likelihood of the fluid from flowing black to the supply.

Fluid outlet port 346 and fluid inlet port 348 cooperate to facilitate fluid recirculation. Fluid outlet port 346 comprises a port through which fluid is pumped or drawn from reservoir 328, wherein a first portion is supplied or delivered to fluid ejection device 382 and wherein a second portion is recirculated or returned to reservoir 328 through fluid inlet port 348. During such recirculation, air may become partially trapped within the lines providing the recirculation loop extending between ports 346 and 348. Recirculation of the fluid may result in air within the fluid line being pushed into reservoir 328 through fluid inlet port 348.

Atmospheric vent 350 comprises an air passage extending from the interior of fluid reservoir 328 to the exterior of fluid reservoir 328, the ambient air or "atmosphere". In one implementation, atmospheric vent 350 may be a direct passage. In other implementations, atmospheric vent 350 be serpentine or in the form of a labyrinth. In one implementation, atmospheric vent 350 comprises a labyrinth screw or vent plug. Because vent 350 vents air within reservoir 328 to atmosphere, separate air gas containing chambers or receivers may be omitted. Pressure within reservoir 328 is maintained, reducing the likelihood of air become entrapped in the fluid delivered to fluid ejection device 382.

Fluid interface connector 368 releasably connects to fluid interface connector 366 of fluid supply station connector module 314. Fluid interface connector 368 is located at an exterior surface or exterior portion of the housing 317 forming module 316. Fluid interconnect 368 cooperatively mates with fluid interconnect 366 to form a fluid coupler that provides a continuous fluid passage such that fluid pumped by fluid supply station pump 368 may flow into fluid reservoir module 316. In one implementation, fluid interconnects 366 and 368 comprise male and female parts, such as a plug and a port. In another implementations, fluid interconnects 366 and 368 may have other cooperating and interlocking structures.

Fluid reservoir pump 370 comprises a fluid pumping mechanism connected fluid outlet port 346. Fluid reservoir pump 370 pumps fluid or withdraws fluid from the interior fluid reservoir 328 and supplies such fluid to fluid recirculation module 317 through fluid interface connector 372. Fluid interface connector 372 comprises a fluid connector that is to be releasably connected to a corresponding fluid connector of fluid circulation module 317. Fluid interface connector 372 facilitates the circulation of fluid from fluid reservoir 328 and out of module 316.

Fluid interface connector 374 comprises a fluid connector connected to fluid inlet port 348. Fluid interface connector 372 comprises a fluid connector that is to be releasably connected to a corresponding fluid connector of fluid recirculation module 317. Fluid interface connector 374 facilitates the recirculation of fluid, the receiving of fluid returning to reservoir 328.

Fluid recirculation module 317 comprises a single housed or enclosed unit that provides for the ejection of fluid received from fluid reservoir module 316. Fluid recirculation module 317 comprises fluid interface connector 376, manifold 377, fluid interface connector 381 and fluid interface connector 384. Fluid interface connector 376 is connected to reservoir pump 370 at an exterior surface or exterior portion of the housing 385 forming module 317. Fluid interface connector 376 cooperatively mates with fluid interface connector 372 to form a continuous uninterrupted fluid passage extending between modules 316 and 317. At the same time, fluid interface connector 376 facilitates separation of modules 316 and 317. In one implementation, connectors 372 and 376 may comprise male and female parts, such as a plug and port. In other implementations, connectors 372 and 376 may connect to one another in other releasable fashions.

Purging manifold 377 couples the recirculation loop 352 to the fluid ejection device 382. Purging manifold 377 includes a reservoir 389 to store a fluid that may facilitate separation of gas and liquid prior to the liquid being transmitted or transferred to fluid ejection device 382. Purging manifold 377 comprises an inlet 390 to receive fluid and an outlet 392 through which fluid is discharged from manifold 377 for being returned to reservoir 328. In some implementations, purging manifold 377 may comprise an internal filter 393 through which the received fluid passes to remove gas from the fluid prior to the fluid being discharged through a supply port 394 that is connected to fluid interface connector 381. Fluid interface connector 381 releasably or removably connects recirculation module 317 to fluid ejection device 382.

Fluid ejection device 382 comprises a device that ejects the fluid under the control of a controller. In one implementation, fluid ejection device 382 ejects fluid using a fluid actuator that displaces fluid in a chamber adjacent the fluid actuator through an orifice. Examples of such a fluid actuator include, but are not limited to, piezo-membrane based actuators, electrostatic membrane actuators, mechanical/impact driven membrane actuators, magnetostrictive drive actuators, electrochemical actuators, external laser actuators (that form a bubble through boiling with a laser beam), other such microdevices, or any combination thereof. In the example illustrated, fluid ejection device 382 receives fluid from purging manifold 377 through fluid interface connector 381 that releasably connects to a corresponding fluid interface connector 395 of fluid ejection device 382.

Fluid interface connector 384 comprise a connector that releasably connects to or cooperatively mates with fluid interface connector 374, forming a continuous fluid passage between modules 316 and 317 for the return of circulating fluid back to reservoir 328 through fluid inlet port 348. In one implementation, fluid interface connectors 384 and 374 comprise male and female parts, such as a plug and port, that provide the breakable interconnection, that allows modules 316 and 317 to be separated and reconnected.

Controller 400 controls operation of system 310. Controller 400 comprises a non-transitory computer-readable medium or memory 402 which includes instructions for directing processing unit 404. Controller 400 receives signals from fluid sensor 332 indicating the level fluid within reservoir 328. Based upon such signals, controller 400 may output control signals directing the operation of pumps 368 and 370. In some implementations, controller 400 may additionally output control signals directing the ejection of fluid by fluid ejection device 382 based upon signals from fluid sensor 332 as well as other signals that indicate how fluid is to be ejected to form a two dimensional image, to selectively deposit fluid at selected locations or print a three-dimensional object.

As discussed above, during use of module 316, air may be contained within the fluid circulation lines 352 forming the recirculation loop. Pumping of fluid from reservoir 328 into lines 352 through the connection provided by connectors 372 and 376 may result in air being pushed through connectors 384 and 374 into reservoir 328 through fluid inlet port 348. Atmospheric vent 350 vents such received air, providing controlled air management for system 310. Excess air is not allowed to build up within reservoir 328, reducing the likelihood of air impairing the performance of system 310.

Figure 5A:
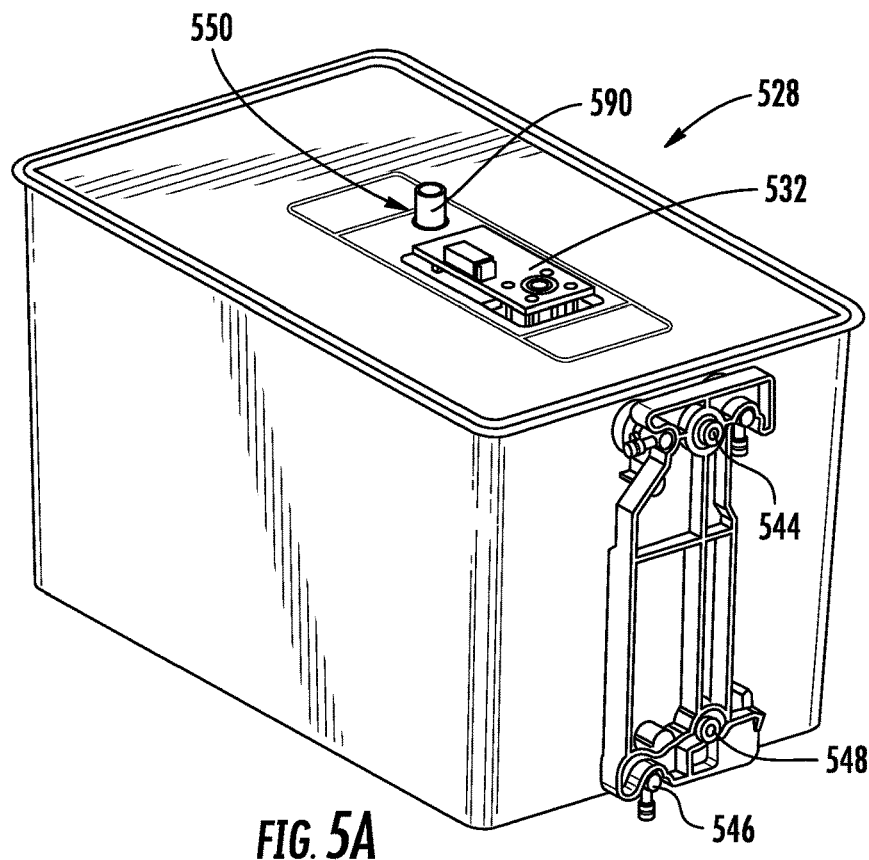
FIG. 5A is a top perspective view of an example fluid reservoir.
Figure 5B:
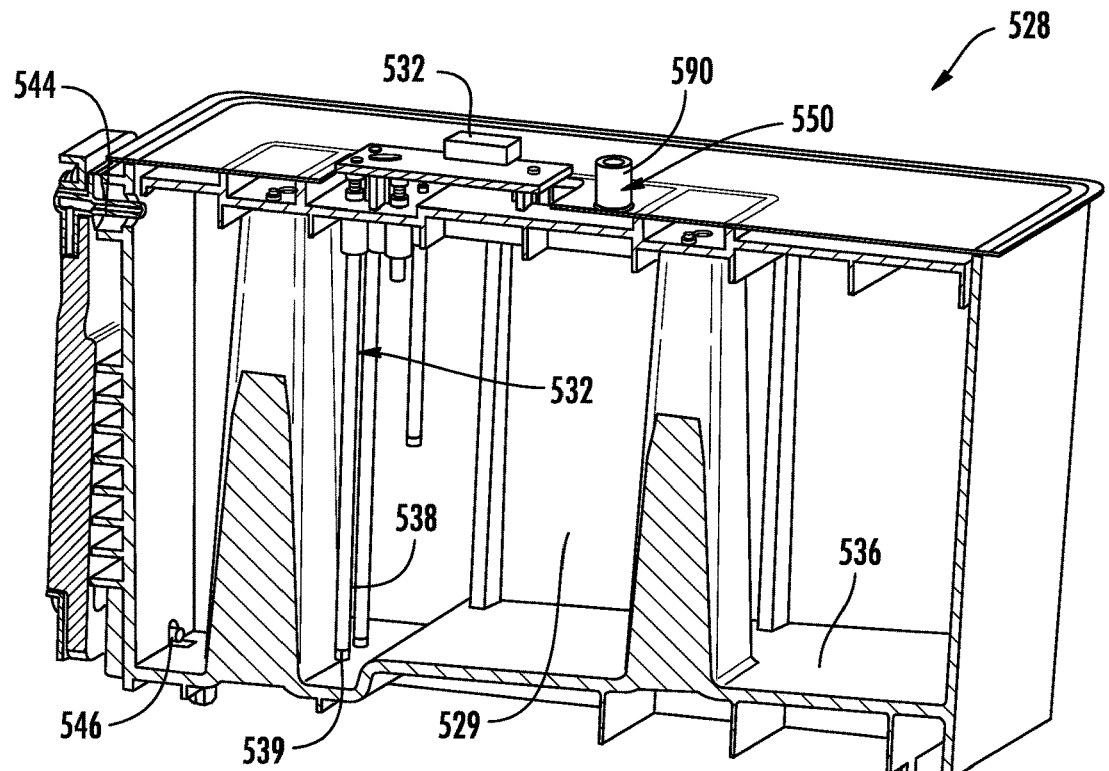
FIG. 5B is a sectional view of the example fluid reservoir of FIG. 5A.

FIGS. 5A-5D illustrate portions of an example fluid reservoir 528 which may be utilized as part of systems 210, 310 in place of reservoirs 28, 328, respectively. Accordingly, systems 210 and 310 are each disclosed as including reservoir 528 in some implementations. As shown by FIG. 5B, reservoir 528 comprises an internal volume to contain a fluid, in the form of a liquid. In one implementation, fluid reservoir 528 is to supply fluid to print a three-dimensional object having a maximum mass, wherein reservoir 528 has an internal volume 529 having a fluid holding capacity no less than the amount of the fluid to print three-dimensional object having the maximum mass. As a result, fluid reservoir 528 is sufficiently sized to supply all of the fluid that would be consumed when printing or forming a largest three-dimensional object producible by fluid ejection system, limiting the task of filling or exchanging reservoir 528 in the middle of a three-dimensional printing task.

Figure 5C:
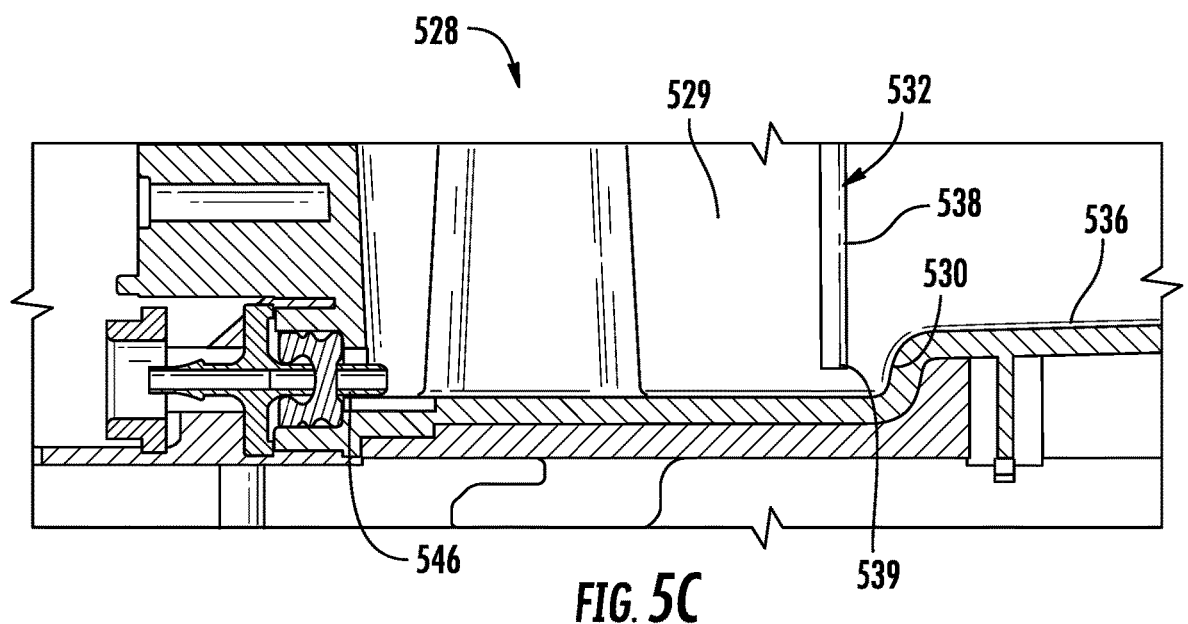
FIG. 5C is an enlarged view of a portion of the example fluid reservoir of FIG. 5B.

As further shown by FIGS. 5B and 5C, fluid reservoir 528 additionally comprises sump 530, fluid sensor 532, fluid supply port 544, fluid outlet port 546, fluid inlet port 548 and atmospheric vent 550 (shown in FIG. 5B). Sump 530 comprises a cavity, recess or depression extending from and below a floor 536 of the interior 529 of reservoir 528. Sump 530 extends adjacent or proximate to outlet port 546. Sump 530 contains the last amounts of fluid within reservoir 528 as reservoir 528 is emptied. Sump 530 facilitates more complete exhaustion or use of fluid from reservoir 528. Sump 530 further facilitates a collection or gathering of fluid about and above outlet port 546 to reduce a likelihood of air entering through outlet port 546 or being pumped by pump 270, 370 through outlet port 546. In one implementation, sump 530 has a depth of at least 3.5 mm. In one implementation, sump 530 contains a volume of fluid of at least 2 cubic centimeters.

Fluid sensor 532 comprises a device to sense the presence of fluid. In one implementation, fluid sensor 532 comprises a pair of electrodes that, when submersed, conduct electrical charge. In other implementations, fluid sensor 532 may comprise other sensing devices. As shown by FIGS. 5B and 5C, fluid sensor 532 comprises at least one probe 538 having a lower terminus 539 that is positioned such that the fluid outlet is submerged while the lower terminus 539 is no longer in contact with the liquid. In one implementation, the lower terminus 539 projects to a top edge of sump 530 or into sump 530 to detect the presence of fluid within sump 530, despite fluid above floor 536 having been exhausted.

Fluid supply port 544 comprises a port through which fluid may be supplied to the interior 529 of fluid reservoir 528. For example, fluid supply port 544 may be connected to a fluid supply station and/or a fluid supply such that the fluid within reservoir 528 may be replenished. In one implementation, fluid supply port 544 is located at a top of reservoir 528, at an elevation higher than an anticipated height of the fluid within reservoir 528, reducing the likelihood of the fluid from flowing black to the supply.

Fluid outlet port 546 and fluid inlet port 548 cooperate to facilitate fluid recirculation. Fluid outlet port 546 comprise a port through which fluid is pumped or drawn from reservoir 528, wherein a first portion is supplied or delivered to fluid ejection device 540 and wherein a second portion is recirculated or returned to reservoir 528 through fluid inlet port 548. During such recirculation, air may become partially trapped within the fluid lines providing the recirculation loop extending between ports 546 and 548. Recirculation of the fluid may result in air within the line being pushed into reservoir 528 through fluid inlet port 548.

Figure 5D:
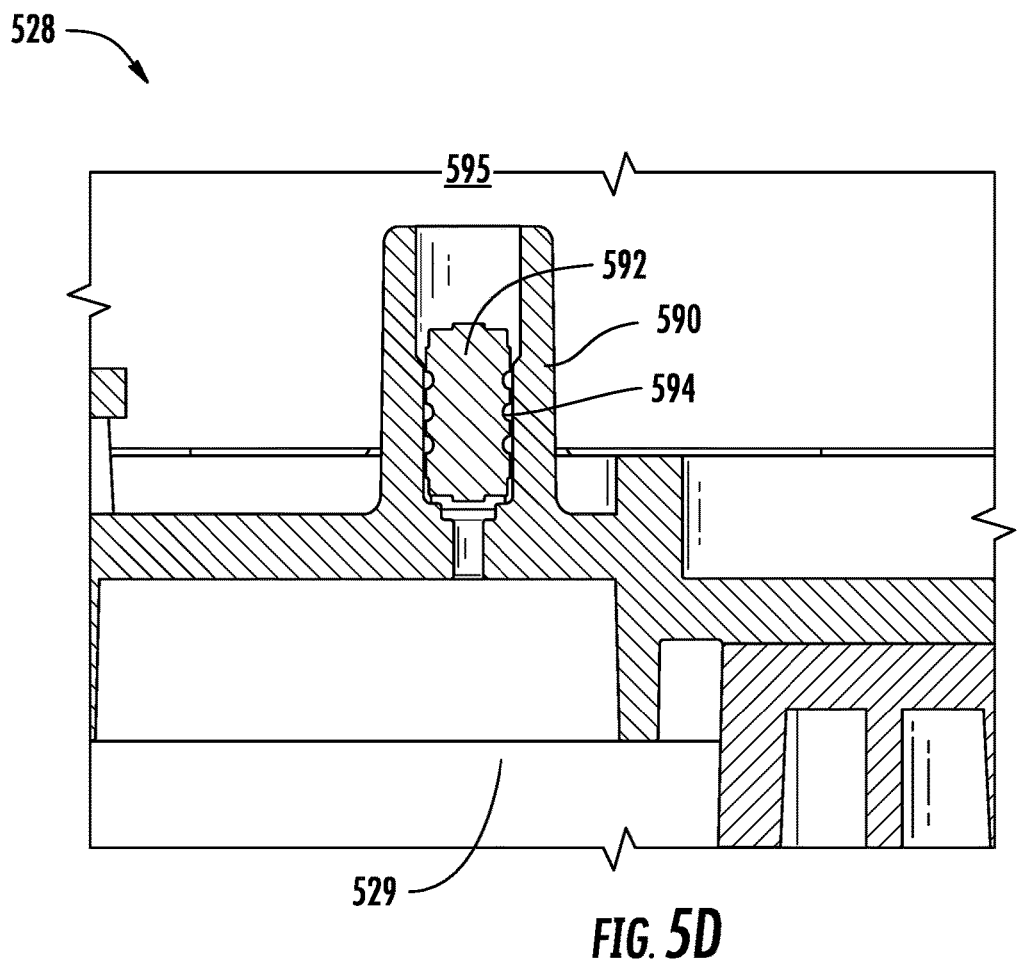
FIG. 5D is a sectional view of a portion of the example fluid reservoir of FIG. 5A.

As shown by FIG. 5D, atmospheric vent 550 comprises an air passage extending from the interior of fluid reservoir 528 to the exterior of fluid reservoir 528, the ambient air or "atmosphere". In the example illustrated, atmospheric vent 550 is serpentine or in the form of a labyrinth. In the example illustrated, atmospheric vent 550 comprises a port 590 connected to the interior 529 with a labyrinth screw or vent plug 592 received within the port 590. The vent plug 592 has an outer circumferential surface having a helical groove providing a serpentine path for air to vent around and along plug 592 from interior 529 to the exterior atmosphere 595. Because vent 550 vents air within reservoir 528 to atmosphere, separate air gas containing chambers or receivers may be omitted. Pressure within reservoir 528 is maintained, reducing the likelihood of air become entrapped in the fluid delivered to fluid ejection device 582.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fluid delivery system comprising:
    a fluid reservoir comprising:
        a fluid supply port through which fluid is supplied to the fluid reservoir;
        a fluid outlet port through which a first portion of discharged fluid is supplied from the reservoir to a fluid ejection device;
        a fluid inlet port through which a second portion of the discharged fluid is recirculated back to the reservoir and through which air is pushed into the reservoir;
        an atmospheric vent to vent the air, that was pushed into the reservoir through the fluid inlet port, from the reservoir;
        a floor;
        a sump extending from the floor adjacent the fluid outlet port; and
        at least one fluid level sensor, wherein the at least one fluid level sensor extends below the floor into the sump.

2. The fluid delivery system of claim 1 further comprising a reservoir module including the fluid reservoir, the reservoir module further comprising:
    a fluid interface connector connected to the fluid supply port for releasable connection to a fluid supply;
    a reservoir pump connected to the fluid outlet to pump fluid to the fluid ejection device;
    a second fluid interface connector connected to the pump; and
    a third fluid interface connector connected to the fluid inlet port.

3. The fluid delivery system of claim 2 further comprising:
    a fluid supply station to be releasably connected to the fluid supply; and
    a fluid supply station pump to draw fluid from the fluid supply through the fluid supply station and to the fluid supply port to the reservoir.

4. The fluid delivery system of claim 3 further comprising a fluid supply station connector module, the fluid supply station connector module comprising:
    the fluid supply station pump; and
    a fourth fluid interface connector connectable to the fluid interface connector to connect the fluid supply station pump to the fluid supply port.

5. The fluid delivery system of claim 4 further comprising a fifth fluid interface connector to releasably connect the fluid supply station connector module to the fluid supply station.

6. The fluid delivery system of claim 5 further comprising:
    a fifth fluid interface connector connectable to the fourth fluid interface connector to releasably connect the fluid supply station to the fluid supply station connector module.

7. The fluid delivery system of claim 1, wherein the at least one sensor is positioned such that the fluid outlet is submerged while the at least one sensor is no longer in contact with the liquid.

8. A fluid delivery method comprising:
    drawing fluid from a reservoir having a floor, a sump extending below the floor, and at least one fluid level sensor, wherein the at least one fluid level sensor extends below the floor into the sump and fluid is drawn from the sump;

pumping the fluid to a fluid ejection device;

returning a portion of the drawn fluid and air to the reservoir; and venting the air from the reservoir to atmosphere.

9. The fluid delivery method of claim 8 further comprising:

releasably connecting a fluid supply station connected to a fluid supply to a fluid inlet port connected to the reservoir.

10. The fluid delivery method of claim 9 further comprising:

releasably connecting the fluid supply station to a fluid supply station connector module comprising a fluid supply station pump; and releasably connecting the fluid supply station connector module to the fluid inlet port connected to the reservoir.

11. The fluid delivery method of claim 8, the method further comprising sensing a fluid level within the reservoir with the fluid level sensor, the fluid level sensor being positioned such that a fluid outlet is submerged while the fluid level sensor is no longer in contact with the fluid.

12. A fluid delivery and ejection system comprising:

a fluid ejection device to selectively eject droplets of fluid;

a fluid reservoir module, the fluid reservoir module comprising:

a fluid reservoir, the fluid reservoir comprising:

a fluid outlet port through which a first portion of discharged fluid is supplied from the reservoir to a fluid ejection device;

a fluid inlet port through which a second portion of the discharged fluid is recirculated back to the reservoir and through which air is pushed into the reservoir;

an atmospheric vent to vent the air, that was pushed into the reservoir through the fluid inlet port, from the reservoir;

a first fluid interface connector;

a reservoir pump connected to the fluid outlet to pump fluid to the fluid ejection device;

a second fluid interface connector connected to the pump;

a third fluid interface connector connected to the fluid inlet port;

a floor;

a sump extending from the floor adjacent the fluid outlet port; and at least one fluid level sensor, wherein the at least one fluid level sensor extends below the floor into the sump;

a fluid supply station connector module comprising:

a fourth fluid interface connector releasably connected to the first fluid interface connector;

a fluid supply station pump connected to the fourth fluid interface connector; and a fifth fluid interface connector; and a fluid supply station module comprising:

a fluid supply station to supply fluid from a fluid supply; and a sixth fluid interface connector connected to the fluid supply station and releasably connected the fifth fluid interface connector.

\* \* \* \* \*